Feb. 20, 1923.
L. W. PAXTON
1,445,796
GAUGE FOR PUNCHING MACHINES
Filed Sept. 14, 1921    2 sheets-sheet 1
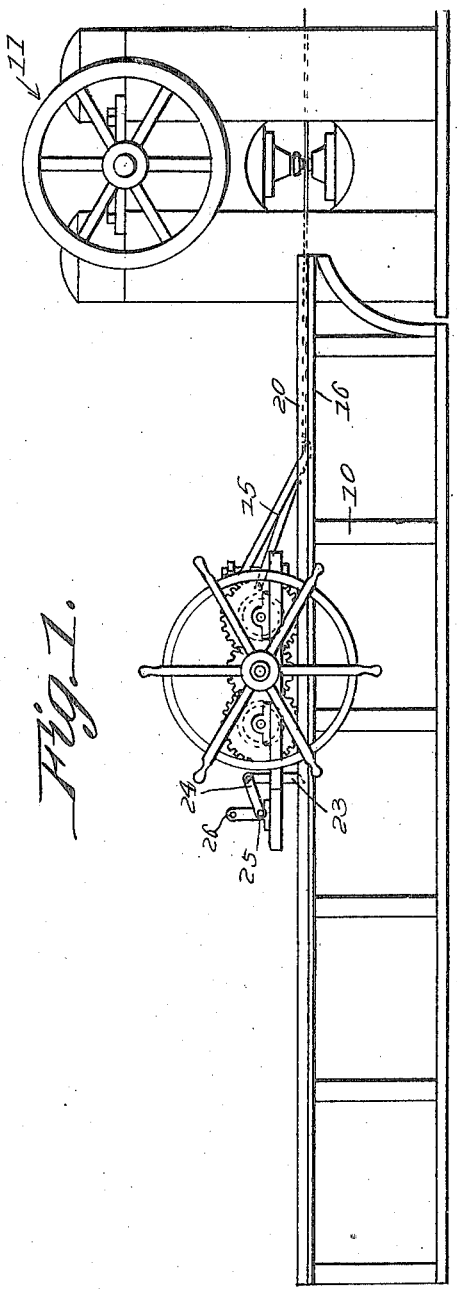
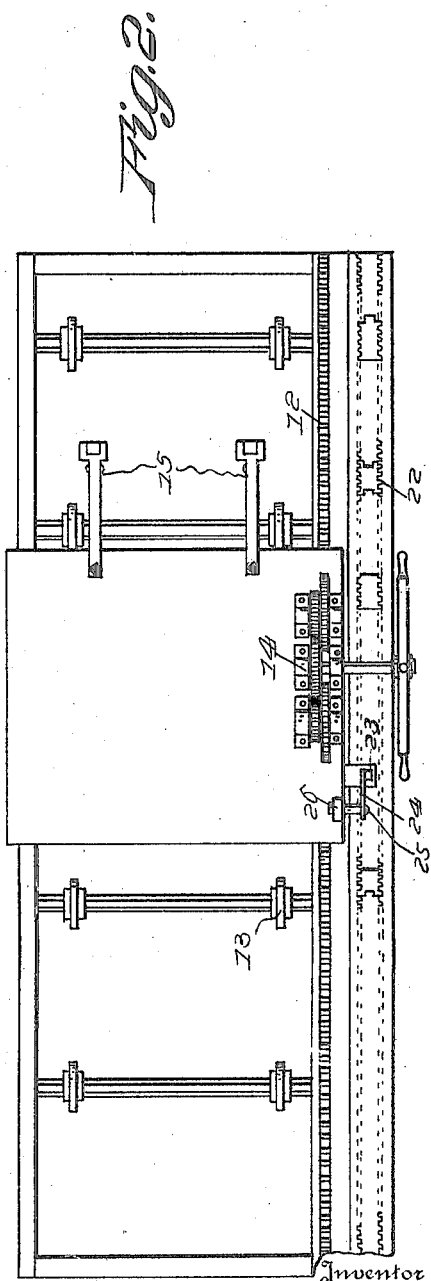
Inventor
Lloyd William Paxton,
By
Attorney Feb. 20, 1923.
L. W. PAXTON
1,445,796
GAUGE FOR PUNCHING MACHINES
Filed Sept. 14, 1921
2 sheets-sheet 2
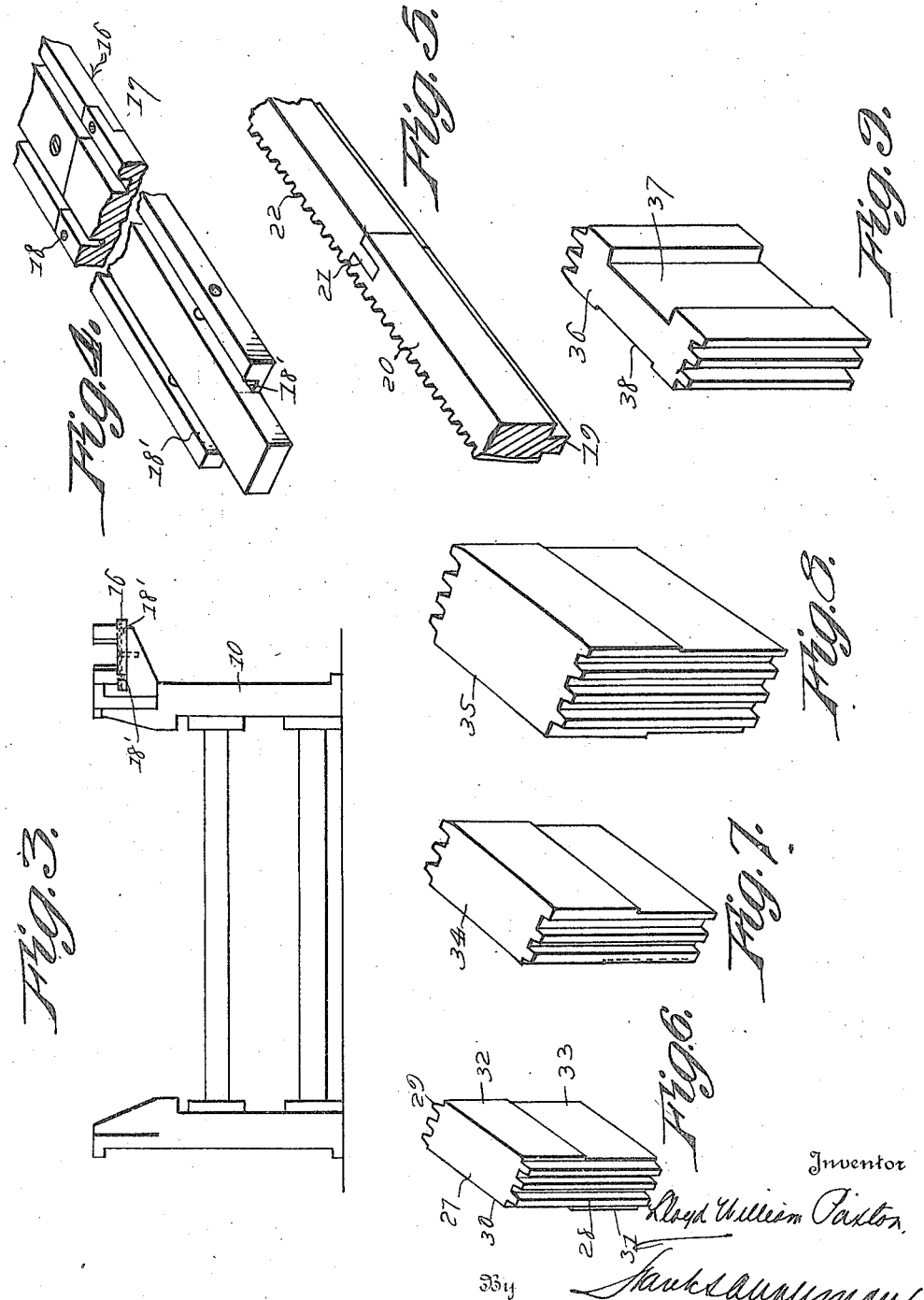

Patented Feb. 20, 1923.

1,445,796

UNITED STATES PATENT OFFICE.

LLOYD WILLIAM PAXTON, OF PITTSBURGH, PENNSYLVANIA.

GAUGE FOR PUNCHING MACHINES.

Application filed September 14, 1921. Serial No. 500,713.

*To all whom it may concern:*

Be it known that I, LLOYD WILLIAM PAXTON, a citizen of the United States of America, and resident of Pittsburgh, in the county of Allegheny and State of Pennsylvania, have invented certain new and useful Improvements in Gauges for Punching Machines, of which the following is a specification.

This invention relates to gauges for punching machines, the same being in the nature of a rack intended for use in connection with plate punching machines in which the work is supported by a carriage and moved with relation to the punches, means being provided for interrupting the movement of the carriage at predetermined intervals or spaces while the punches are being operated to produce the holes.

It is an object of this invention to produce a rack applicable to a frame of a punching machine, novel means being provided in the nature of stops with relation to which the tripping mechanism operates for arresting the movement of the carriage when the work has been carried a predetermined distance, in order that the work may be presented in proper position with respect to the punches so that holes may be formed in correct positions with relation to other parts which are to receive rivets, bolts or the like for fastening parts of bridges or other metal structures together.

It is an object of this invention to produce a gauge to be used in connection with punching machines which do not use a templet, and is principally for use in punching plate multiples, beam racks and other work where a templet is not employed, the purpose of the stop or table arresting mechanism being to provide means for setting a machine rapidly and accurately to avoid the loss of time.

It is furthermore an object of the invention to produce a device of this character which will permit the movement of the table or carriage and to determine the said movement within fractions of an inch, it being possible by the use of this invention to so set the mechanism as to determine the movement of the carriage, permitting it to move from one-sixteenth of an inch to several feet.

With the foregoing objects in view, the stops or arresting means are applicable for use on short or long spacing, the stops being proportioned in size so that they will have strength to withstand shock imparted to it by arresting the table or carriage after it has moved a great distance, or even though it moves but slightly, and hence, different size stops are employed or provided to withstand the kick of the carriage proportionally to the distance it travels.

In describing the invention in detail, reference will be had to the accompanying drawings forming part of this application wherein like characters denote corresponding parts in the several views, and in which—

Figure 1 illustrates a view in elevation of a punching machine with the device embodying the invention applied thereto;

Figure 2 illustrates a top plan view thereof;

Figure 3 illustrates an end view of the table having the rack;

Figure 4 illustrates a perspective view of the bottom of the rack;

Figure 5 illustrates a perspective view of fragments of one side of the rack; and Figures 6, 7, 8 and 9 illustrate perspective views of stopping blocks of different dimensions.

In these drawings 10 denotes the frame of a carriage, and 11 the punching machine, the latter of which is but conventionally shown, since it is intended to be capable of punching sheets of metal which are moved with respect to it by the carrier. As the construction of the punch does not form a part of the present invention, it need not, it is thought, be shown in detail.

The carriage frame 10 has the usual feed rack 12, and carriage supports such as 13 over which the carriage moves, and suitable gearing 14 which may be turned in the usual manner for causing the carriage to travel longitudinally of the table, and 15 are conventional types of work clamps adapted to engage the sheets or plates of metal to be moved with respect to the punching machine.

Associated with the frame 10, there is employed a guide rack, the present embodiment of which comprises a sectional base 16, the sections of which have overlapping joints such as 17, secured together by fastenings 18 such as screws or the like. The base has longitudinally disposed slots or seats 18' in spaced relation to each other and they are intended to receive the ribs 19 of the side racks 20 which are shown as being constructed in sections connected together by a tongue and groove joint 21, although the details of assembling these parts may be changed to suit particular requirements.

The side racks have vertically extending teeth 22 on their inner faces, the teeth being of uniform size and spaced from end to end of the rack, in the present embodiment of the invention, and these side racks constitute anchorages for stop blocks, which will be presently described.

There is a bolt or rivet 23 which extends through the carriage preferably vertically, and its end extends into the space between the side racks in order that the said bolt will engage a stop and arrest the carriage when it has moved a predetermined distance, and the bolt is movable vertically under the influence of the arm 24 which is mounted on a shaft 25, the said shaft being partially rotated by power applied to the arm or handle 26 which extends, in the present showing, upwardly from the shaft 25.

The stop blocks here illustrated are modifications, one of the other, for the purpose of increasing the range of adjustment which may be afforded by their use. The block 27 has oppositely disposed teeth 28 and 29 which are intended to mesh with the teeth of the rack members for holding the block in different positions with respect to the length of the rack. The block 27 may be inverted and by reason of the fact that the sides of the block are at different distances from the teeth, it will be observed that a wide range of adjustment may be attained by this expedient. For instance, the surface 30 of the block is spaced from the teeth a less distance than the face 31, since the face 31 projects beyond the plane of the face 30. The face 32 of the block projects to a greater degree than the face portion 33 thereof. Hence, if the block is inserted to present the face 32 to the bolt 23, the carriage will move a slightly less distance than it would if the block were inverted and the bolt moved to engage the face 33. Furthermore, this block is relatively light and is intended to be used when the carriage is arrested at short intervals, and the same is true with respect to the block 34 which has its faces differently spaced with relation to the teeth. The block 35 is relatively heavy and is intended to be employed when the carriage is to move a long distance prior to its being arrested, for it is then a greater impact results from the engagement of the bolt and the said block, and the number of teeth is increased.

In the form shown in Fig. 8, the block 35 has its faces at different distances with respect to the teeth, and as the purpose of this arrangement has been indicated, it is believed unnecessary to elaborate it.

In the modification shown in Fig. 9, the block 36 has teeth of the general character of those heretofore described, but in this embodiment of the invention, the faces are recessed to different depths, the recess 37 being greater than the recess 38, and hence a very fine adjustment could be attained by presenting one or the other of the faces to be engaged by the bolt, and from this illustration of the possibilities of adjustment, it will be understood that one skilled in the art could so construct the blocks as to get a most minute adjustment for controlling the movement of the carriage with respect to the punching machine.

I claim:

1. In a gauge for punching machines, a sectional bottom having grooves in its upper face, sides having tongues fitting in the grooves, teeth on the inner surfaces of the sides, blocks having teeth fitted between the said sides and engaging the teeth thereof, and a carriage having a bolt projecting between the sides and adapted to contact the blocks.

2. In a gauge for punching machines, a rack comprising a bottom and internally toothed sides supported in operative relation to a carriage, blocks having teeth adapted to engage the teeth of the sides and having sectional faces differently spaced with respect to the teeth, and a member on the carriage adapted to engage the stops when the carriage is moved predetermined distances.

3. In a gauge for punching machines, a rack comprising a bottom and internally toothed sides supported in operative relation to a carriage, blocks having teeth adapted to engage the teeth of the sides and having sectional faces differently spaced with respect to the teeth, a member on the carriage adapted to engage the stops when the carriage is moved predetermined distances, and means for moving the member into and out of the range of the stops.

LLOYD WILLIAM PAXTON.